United States Patent
Hano et al.

(10) Patent No.: US 6,702,881 B2
(45) Date of Patent: Mar. 9, 2004

(54) INK FOR INKJET PRINTER

(75) Inventors: Yoshifumi Hano, Chino (JP);
Chiyoshige Nakazawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 10/066,672

(22) Filed: Feb. 6, 2002

(65) Prior Publication Data

US 2002/0174801 A1 Nov. 28, 2002

(30) Foreign Application Priority Data

Feb. 6, 2001 (JP) ........................ 2001-029105
Feb. 7, 2001 (JP) ........................ 2001-030405

(51) Int. Cl.$^7$ .............................................. C09D 11/02
(52) U.S. Cl. ................. 106/31.15; 106/31.32; 106/31.58; 106/31.64; 106/31.86
(58) Field of Search ................ 106/31.15, 31.32, 106/31.58, 31.64, 31.86

(56) References Cited

U.S. PATENT DOCUMENTS

| | | | | |
|---|---|---|---|---|
| 4,945,121 A | * | 7/1990 | Micale et al. | 523/339 |
| 5,560,771 A | * | 10/1996 | Takemoto et al. | 106/31.49 |
| 5,748,208 A | * | 5/1998 | Uchiyama et al. | 347/43 |
| 5,865,883 A | * | 2/1999 | Teraoka et al. | 106/31.32 |
| 5,871,572 A | * | 2/1999 | Marritt | 106/31.36 |
| 6,001,899 A | * | 12/1999 | Gundlach et al. | 523/160 |
| 6,004,389 A | * | 12/1999 | Yatake | 106/31.86 |
| 6,168,892 B1 | * | 1/2001 | Ohara et al. | 430/45 |
| 6,284,027 B1 | * | 9/2001 | Auslander et al. | 106/31.15 |
| 6,425,948 B1 | * | 7/2002 | Nowak et al. | 106/31.15 |
| 6,500,248 B1 | * | 12/2002 | Hayashi | 106/31.86 |
| 2002/0063765 A1 | * | 5/2002 | Hakamada et al. | 347/100 |
| 2002/0109765 A1 | * | 8/2002 | Sato et al. | 347/100 |
| 2002/0112641 A1 | * | 8/2002 | Naruse et al. | 106/31.27 |

FOREIGN PATENT DOCUMENTS

| | | |
|---|---|---|
| JP | A-58-49765 | 3/1983 |
| JP | A-4-359071 | 12/1992 |
| JP | A-9-78012 | 3/1997 |
| JP | A-9-78022 | 3/1997 |
| JP | A-10-251570 | 9/1998 |
| JP | A-11-152436 | 6/1999 |

* cited by examiner

*Primary Examiner*—Helene Klemanski
*Assistant Examiner*—Veronica F. Faison
(74) *Attorney, Agent, or Firm*—Oliff & Berridge, PLC

(57) ABSTRACT

The present invention provides ink for an ink-jet printer containing a fluorescent compound which emits fluorescence by ultraviolet irradiation, a surfactant, and water. The ink can satisfy all points of quick-drying property of the ink after printing, print quality, and change in the hue, lightness, and chroma of the print part by irradiation of light source. A fluorescent compound which has absorption in the visible light range and which emits fluorescence by ultraviolet irradiation and a fluorescent compound which has no absorption in the visible light range and which emits fluorescence, by ultraviolet irradiation, with a hue different from that of the fluorescence emitted from the aforementioned fluorescent compound under visible light are mixed.

7 Claims, No Drawings

INK FOR INKJET PRINTER

BACKGROUND OF THE INVENTION

1. Field of Invention

The present invention relates to ink for an ink-jet printer containing a fluorescent compound which has no absorption in the visible light range, and which emits fluorescence by ultraviolet irradiation. The invention also relates to ink for ink-jet printer containing a fluorescent compound which has absorption in the visible light range, and which emits fluorescence by ultraviolet irradiation.

2. Description of Related Art

Ink-jet printing is performed in such a way that letters, graphics, and images are directly printed on recording media by ejecting ink from a fine nozzle as droplets. A drop-on-demand system and a continuous system are exemplary systems of ink-jet printing.

The drop-on-demand system is a system in which ink is ejected as needed, and ink-jet printers of this system have been used as printers for personal computers, etc. The continuous system is a system in which continuously ejected ink particles are charged in accordance with electric signals, and only needed ink particles are ejected on paper. The continuous system is superior in high-speed printing.

In common ink for an ink-jet printer, a coloring agent, which absorbs a part of visible light and generates reflected light (which has reflected light) under visible light, is contained at a concentration at which the color of print is visible to the naked eye. On the other hand, fluorescent ink containing a fluorescent compound, which has no absorption in the visible light range and which emits fluorescence (emits light in the visible light range) by ultraviolet irradiation, is disclosed in Japanese Unexamined Patent Application Publication No. 58-49765 and Japanese Unexamined Patent Application Publication No. 11-152436.

In Japanese Unexamined Patent Application Publication No. 58-49765, an ink for ink-jet printer containing a fluorescent compound, which has absorption in the visible light range and which emits fluorescence by ultraviolet irradiation at a concentration at which a recording concentration on recording paper becomes 0.1 or less on an optical density basis (that is, a content at which the color of print is not visible to the naked eye under visible light), is disclosed.

When each of the ink described in these publications and common ink for ink-jet printer are respectively ejected from a plurality of nozzles of an ink-jet head, for example, letters that are to be shown to a person, and letters which emit fluorescence by ultraviolet irradiation, can be printed at the same time with ease. That is, the print part is visually identified under the visible light, for example, sunlight, fluorescent light, and incandescent lamp, and under the light source having a predetermined spectral energy distribution with different hue, lightness, and chroma.

However, since the florescent ink disclosed in Japanese Unexamined Patent Application Publication No. 11-152436 is for an ink-jet printer of the continuous system, when this ink is used for an ink-jet printer of the drop-on-demand system, printing reliability may be reduced because of a difference in the print system.

Herein, the fluorescent ink used for the ink-jet printer, in which the printing system is the drop-on-demand system, is required to have the following characteristics.

(1) High quality images are produced on plain paper.

(2) The ink is promptly fixed and, therefore, high-speed printing can be performed.

(3) Nozzles are not clogged, and stable ejection can be performed, wherein skew in ejection (this refers to that the ink is not ejected in the precisely downward direction, but is ejected in the slanting direction) and dot dropout do not occur.

(4) The hue, lightness, and chroma of the print part are significantly changed by irradiation of light source.

In the related art, in order to address (2) above, many sorts of ink have been suggested, wherein an organic solvent or surfactant (referred to as "penetrant") is added in the ink. Among them, in the related art, when an acetylene glycol (acetylenediol)-based surfactant is used, prints with no blur can be produced by deep permeation of the ink in the direction of the thickness of paper, while the printing speed is ensured. Japanese Unexamined Patent Application Publication No. 4-359071 discloses this feature.

In order to address (4) above, significantly changing the hue of the print part, the ink containing a plurality of fluorescent compounds which are substantially transparent with respect to visible light, and which emit fluorescence by irradiation of ultraviolet lights having different wavelengths has been known. Japanese Unexamined Patent Application Publication No. 10-251570 discloses this feature. However, in this method, a specific apparatus capable of irradiating a plurality of ultraviolet lights is required for the detection.

In order to address (4) above, significantly changing the lightness and chroma of the print part, for example, an ink composition using transparent fine solid particles having a particle diameter of 1 μm or less is disclosed in Japanese Unexamined Patent Application Publication No. 9-78022. This publication discloses that when fine particles are added, the fine particles are fixed on the surface of the paper, a fluorescent dye is adsorbed thereon and, therefore, the concentration of the fluorescent dye is increased, and the emission intensity during ultraviolet irradiation is increased. Consequently, it is believed that in this case, when the acetylenediol-based surfactant is used for the purpose of (2) above, the fluorescent compound in the fluorescent ink deeply permeates into the paper and, therefore, adequate fluorescence emission intensity is not achieved.

As described above, regarding the ink containing the fluorescent compound for an ink-jet printer of the drop-on-demand system, products capable of satisfying all points of quick-drying property of the ink after printing, print quality, and change in the hue, lightness, and chroma of the print part by irradiation of light source have been required, and, therefore, the ink disclosed in each of the aforementioned publications is susceptible to further enhancement.

SUMMARY OF THE INVENTION

Accordingly, it is a first object of the present invention to provide an ink for an ink-jet printer containing a fluorescent compound which has no absorption in the visible light range and which emits fluorescence by ultraviolet irradiation, a surfactant, and water, such that the ink can satisfy all points of quick-drying property of the ink after printing, print quality, and change in the hue, lightness, and chroma of the print part by irradiation of light source.

It is a second object of the present invention to provide an ink for an ink-jet printer containing a fluorescent compound which has absorption in the visible light range and which emits fluorescence by ultraviolet irradiation, a surfactant, and water, such that the ink can satisfy all points of quick-drying property of the ink after printing, print quality, and change in the hue, lightness, and saturation of the print part by irradiation of light source.

In order to address the aforementioned problems, the present invention provides an ink for an ink-jet printer containing a fluorescent compound which has no absorption in the visible light range and which emits fluorescence by ultraviolet irradiation, a surfactant, and water. The ink for an ink-jet printer is provided such in that the surfactant is an acetylenediol (acetylene glycol)-based surfactant represented by the following Chemical formula (1) and formed of a mixture of a first compound and a second compound where R is an isobutyl group (—CH$_2$CH(CH$_3$)CH$_3$) and where R is an ethyl group (—CH$_2$CH$_3$), respectively, and where when the content of the first compound in the ink is indicated by A (% by weight) and the content of the second compound is indicated by B (% by weight), A and B are more than "0", and the relationship between A and B is configured to satisfy the following mathematical expression $5.0 \leq 16A+B \leq 6.5$. This is referred to as "the first ink" of the present invention.

[Chemical formula (1)]

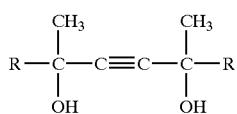

The present invention provides an ink for an ink-jet printer containing a fluorescent compound which has absorption in the visible light range and which emits fluorescence by ultraviolet irradiation, a surfactant, and water. The ink for an ink-jet printer is provided such that the surfactant is an acetylenediol (acetylene glycol)-based surfactant represented by the aforementioned Chemical formula (1) and is formed of a mixture of a first compound and a second compound where R is an isobutyl group (—CH$_2$CH(CH$_3$)CH$_3$) and where R is an ethyl group (—CH$_2$CH$_3$), respectively, and that where the content of the first compound in the ink is indicated by A (% by weight) and the content of the second compound is indicated by B (% by weight), A and B are more than "0", and the relationship between A and B is configured to satisfy the aforementioned mathematical expression (1). This is referred to as "the second ink" of the present invention.

The surface tension of the first compound is 26 to 38 mN/m, and the surface tension of the second compound is 50 mN/m or more.

The present invention provides an ink for an ink-jet printer that is formed of a fluorescent compound which has absorption in the visible light range and which emits fluorescence by ultraviolet irradiation and a fluorescent compound which has no absorption in the visible light range and which emits fluorescence, by ultraviolet irradiation, with a hue different from the hue of the fluorescence emitted from the aforementioned fluorescent compound under visible light. This is referred to as "the third ink" of the present invention.

According to the first ink and the second ink of the present invention, by using the surfactant mixed in order that the relationship between the contents A and B of the first compound and the second compound in the ink may satisfy the aforementioned mathematical expression (1), the ink capable of satisfying all points of quick-drying property of the ink after printing, print quality, and change in the hue, lightness, and chroma of the print part by irradiation of light source can be produced as an ink for an ink-jet printer containing a fluorescent compound, a surfactant, and water.

Regarding the first ink and the second ink of the present invention, where "16A+B" is less than 5.0, an effect of enhancing permeability of the ink is not sufficient, and where it exceeds 6.5, blurring occurs, an ejecting condition of the ink is adversely affected and, therefore, the print quality is degraded.

As the first compound constituting the surfactant used for the first ink and the second ink of the present invention, "Surfynol 104" manufactured by Air Products and Chemicals. Inc., is commercially available. As the second compound, "Surfynol 82" manufactured by Air Products and Chemicals. Inc., is commercially available.

The contents of the surfactants in the first ink and the second ink of the present invention are preferably within the range of not less than 0.3% by weight to not more than 5.0% by weight relative to the total amount of the ink.

In the first ink of the present invention, as the fluorescent compound, dies referred to as "fluorescent whitener" can be used. For example, diaminostilbene-based, distyrylbiphenyl-based, imidazole-based, naphthalimide-based, and coumalin-based fluorescent whiteners, etc., can be used. Examples of commercially available products include, for example, "Kayaphor AP Liquid", "Kayaphor GMY Liquid", and "Kayaphor S Liquid" manufactured by NIPPON KAYAKU COLORS CO., LTD., "TINOPAL ABP-Z Liquid", "TINOPAL MSP Liquid", "UVITEX NFW Liquid", and "TINOPAL UP Liquid" manufactured by Ciba Specialty Chemicals.

In the second ink of the present invention, as the fluorescent compound, dies referred to as "fluorescent dye", pigments referred to as "fine particle fluorescent pigment", in which fine particles made of a synthetic resin are dyed with a fluorescent dye, can be used. Examples of commercially available products include, for example, "Kayanol Rhodamine FB", "Kayafect Yellow G Liq", "Kayafect Yellow C Liq", "Kayarus Light Yellow F8G", "Kayanol Brilliant Flavine FL", "Kayaset Flavine F2G", "Kayacryl Brill-.Pnik B-ED", and "Kayacryl Brill.Pink B200" manufactured by NIPPON KAYAKU COLORS CO., LTD. Examples of fluorescent pigments include, for example, "LUMIKOL NKW-3002", "LUMIKOL NKW-3003", "LUMIKOL NKW-3004", "LUMIKOL NKW-3005", and "LUMIKOL NKW-3007", which have an average particle diameter of about 100 nm, manufactured by Nippon Keiko Kagaku K.K., "SF-5012", "SF-5013", "SF-5014", "SF-5015", "SF-5017", and "SF-5037", which have an average particle diameter of about 100 nm, manufactured by SINLOIHI CO., LTD., and "SF-7012", "SF-7014", "SF-7015", and "SF-7017", which have an average particle diameter of about 400 nm, manufactured by SINLOIHI CO., LTD.

When the ink of the present invention is applied to printing using an ink-jet recording apparatus, it is desirable to use a fluorescent dye having excellent printing reliability and ink preservation stability as the fluorescent compound. For example, where dispersing elements dispersed in water are used, the average particle diameter of the aforementioned dispersing elements is desirably 500 nm or less, and more desirably, is 300 nm or less. By making the particle diameter of the dispersing elements fine, ink dispersion stability, nozzle clogging property in the ink-jet recording apparatus, etc., can be enhanced.

Regarding conventional ink compositions, where the content of the fluorescent compound is high, concentration quenching occurs, fluorescent emission intensity is reduced significantly and, therefore, sometimes practically adequate fluorescent emission intensity cannot be achieved. On the other hand, regarding the ink composition of the first or second ink of the present invention, by specifying the surfactants as described above, the fluorescent compound in the ejected ink permeates into not only the surface, but also the inside of the paper and is distributed over a wide range. Accordingly, even where the content of the fluorescent compound is a high concentration compared to a conventional value, significant reduction of the fluorescent emission intensity due to the concentration quenching does not occur.

According to the third ink of the present invention, by mixing and using the fluorescent compound which has absorption in the visible light range and which emits fluorescence by ultraviolet irradiation and the fluorescent compound which has no absorption in the visible light range and which emits fluorescence, by ultraviolet irradiation, with a hue different from that of the fluorescence emitted from the aforementioned fluorescent compound under visible light, an ink, in which the hue, lightness, and chroma of the print part significantly change by ultraviolet irradiation, can be produced.

Regarding the ink of the present invention, although the content of the aforementioned fluorescent compound in the ink is appropriately determined in accordance with the required characteristics, it is preferably 0.1% by weight or more, but 20% by weight or less, and more preferably, is 1.0% by weight or more, but 15% by weight or less. Where the addition amount is more than 20% by weight, clogging at the nozzle tip becomes likely to occur in spite of the addition of a humectant, and the printing reliability is reduced. Where the content of the fluorescent compound is less than 0.1% by weight, the change in the hue, lightness, and chroma of the print part is small in the case where ultraviolet irradiation is performed and, therefore, visibility is poor.

For example, in the case where contents of a print are desired to be made invisible under visible light, it is necessary to use a fluorescent compound which has absorption in the visible light range and which emits fluorescence by ultraviolet irradiation, and to make the content thereof usually 1.0% by weight or less although depending on the coloring power of the fluorescent compound. In this case, it is desirable to use a fluorescent compound providing Yellow reflected color having a low relative luminous efficiency as the fluorescent compound.

Where the hue, lightness, and chroma of the print part is changed by irradiation of light source, while the visibility of the print is ensured, in order to prevent print forgery by, for example, color copy, etc., it is necessary to use a fluorescent compound which has absorption in the visible light range and which emits fluorescence by ultraviolet irradiation, and to make the content thereof usually 1.0% by weight or more although depending on the coloring power of the fluorescent compound.

The ink of the present invention preferably contains polyhydric alcohols in order to prevent clogging of nozzles. Specific examples of polyhydric alcohols include, for example, ethylene glycol, diethylene glycol, triethylene glycol, tetraethylene glycol, propylene glycol, dipropylene glycol, tripropylene glycol, polyethylene glycol having a molecular weight of 2,000 or less, 1,3-propylene glycol, isopropylene glycol, isobutylene glycol, 1,4-butanediol, 1,3-butanediol, 1,5-pentanediol, 1,6-hexanediol, glycerin, thioglycol, mesoerythritol, pentaerythritol.

Among these, glycerin, 1,5-pentanediol, diethylene glycol, and furthermore, mixtures thereof are preferable because the viscosity of the ink composition can be properly controlled, and clogging of nozzles can be prevented effectively. The addition amounts of these polyhydric alcohols are preferably 3% to less than 40% by weight relative to the ink composition, and more preferably, are 5% to 30% by weight.

DETAILED DESCRIPTION OF PREFERRED EMBODIMENTS

Embodiments according to the present invention will be described below.

First Embodiment

As the liquid of fluorescent compound constituting the first ink of the present invention, "Kayaphor S Liquid" manufactured by NIPPON KAYAKU COLORS CO., LTD., was prepared.

As the first compound of the surfactant constituting the first ink of the present invention, "Surfynol 104H (manufactured by Air Products and Chemicals. Inc.)", which was an aqueous solution containing 37.5% by weight of the first compound, was prepared. As the second compound of the surfactant constituting the ink of the present invention, "Surfynol 82 (manufactured by Air Products and Chemicals. Inc.)" made of the powder of the second compound was prepared.

Furthermore, glycerin and n-methyl-2-pyrrolidone were prepared as other additives.

Each of these components and ultrapure water were mixed in order that the content of the components, solution of fluorescent compound, n-methyl-2-pyrrolidone, and glycerin, might become 3.0% by weight, 8.0% by weight, and 20% by weight, respectively. Many sorts of ink were manufactured, in which the content A (% by weight) of the first compound and the content B (% by weight) of the second compound were changed.

The contents A and B of the first compound and the second compound were changed as shown in the following Table 1. The weight of the effect of enhancing ink permeability of the first compound was assumed to be 16 times larger than that of the second compound, and a permeability evaluation value (16A+B) of the surfactant formed of a mixture of both compounds was determined by calculation.

Printing tests were performed using the many sorts of ink manufactured, and the permeability of the ink after printing (quick-drying property), print quality, and fluorescence-emitting condition of the print part were examined. Regarding the printing test, an ink-jet printer "Epson TM-J8000" of the drop-on-demand system was used, and letters for the printing test were printed on "Register paper" manufactured by Oji Paper Co., Ltd.

Regarding the permeability of the ink after printing, a solid image was printed and, thereafter, stain of the print surface was visually evaluated. The case where the print surface was not stained was indicated by "○", and the case where the quick-drying property was poor and the print surface was stained was indicated by "x".

Regarding the print quality, an ultraviolet light having a wavelength of 365 nm was irradiated to the print part to cause fluorescent emission and, therefore, the printed letters were made to emerge. These letters were enlarged with a stereoscopic microscope, and a print concentration, dot shape, and dot size were completely judged.

Regarding the fluorescence-emitting condition of the print part, where an ultraviolet light having a wavelength of 365 nm was irradiated to the print surface from 15 cm above the print with a handy UV lamp SLUV-4 (manufactured by K.K. Iuchi Seieido), the case where significant change in the hue, lightness, and chroma was visually observed was indicated by "○", and the case where a little change in the hue, lightness, and chroma was visually observed was indicated by "x".

These results are collectively shown in the following Table 1 as well.

TABLE 1

| | No. 1- | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 104H Addition Amount (wt %) | | | 0.50 | | | | | | 0.60 | | | | | 0.70 | | |
| Content A of the First Compound (wt %) | | | 0.188 | | | | | | 0.225 | | | | | 0.263 | | |
| Content B of the Second Compound (wt %) | 1.50 | 2.00 | 2.50 | 3.00 | 3.50 | 4.00 | 1.00 | 1.50 | 2.00 | 2.50 | 3.00 | 0.50 | 1.00 | 1.50 | 2.00 | 2.50 |
| 16 A + B | 4.5 | 5.0 | 5.5 | 6.0 | 6.5 | 7.0 | 4.6 | 5.1 | 5.6 | 6.1 | 6.6 | 4.7 | 5.2 | 5.7 | 6.2 | 6.7 |
| Ink Manufacturability | ○ | ○ | ○ | ○ | ○ | ○ | ○ | ○ | ○ | ○ | ○ | ○ | ○ | ○ | ○ | ○ |
| Permeability | x | ○ | ○ | ○ | ○ | ○ | x | ○ | ○ | ○ | ○ | x | ○ | ○ | ○ | ○ |
| Print Quality | x | ○ | ○ | ○ | ○ | x | x | ○ | ○ | ○ | x | x | ○ | ○ | ○ | x |
| Fluorescence Intensity | — | ○ | ○ | ○ | ○ | — | — | ○ | ○ | ○ | — | — | ○ | ○ | ○ | — |

As is clear from this Table, where "16A+B" is 5.0 or more, but 6.5 or less, the ink which can satisfy all points of the quick-drying property (permeability), print quality, and adequately significant change in the hue, lightness, and chroma of the print part is produced. Where "16A+B" is less than 5.0, the quick-drying property and print quality become inferior. Where "16A+B" exceeds 6.5, the quick-drying property is superior, but the print quality becomes inferior. Regarding Nos. 1-1, 1-6, 1-7, 1-11, 1-12, or 1-16, since the print quality was inferior, evaluation of the fluorescence-emitting condition of the print part was not performed. Regarding all samples, generation of bubbles, etc., did not occur during manufacture of the ink and, therefore, the ink manufacturability was excellent.

Second Embodiment

As the first compound of the surfactant constituting the first ink of the present invention, "OLFIN STG (manufactured by Nissin Chemical Industry Co., Ltd.)", which was an aqueous solution containing 85.0% by weight of the first compound, was used. Except for this, in the same manner as that in the aforementioned First embodiment, the content of the components, fluorescent compound, n-methyl-2-pyrrolidone, and glycerin, were made to become 3.0% by weight, 8.0% by weight, and 20% by weight, respectively, and, therefore, many sorts of ink were manufactured, in which the content A (% by weight) of the first compound and the content B (% by weight) of the second compound were changed.

The contents A and B of the first compound and the second compound were changed as shown in the following Table 2. The weight of the effect of enhancing ink permeability of the first compound was assumed to be 16 times larger than that of the second compound, and a permeability evaluation value (16A+B) of the surfactant formed of a mixture of both compounds was determined by calculation.

Printing tests were performed using the many sorts of ink manufactured, and the permeability of the ink after printing (quick-drying property), print quality, and fluorescence-emitting condition of the print part were examined in the same manner as that in the First embodiment.

These results are collectively shown in the following Table 2 as well.

TABLE 2

| | No. 2- | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| STG Addition Amount (wt %) | | | | 0.20 | | | | | | | 0.30 | | | |
| Content A of the First Compound (wt %) | | | | 0.170 | | | | | | | 0.225 | | | |
| Content B of the Second Compound (wt %) | 2.00 | 2.30 | 2.70 | 3.00 | 3.30 | 3.70 | 4.00 | 0.70 | 1.00 | 1.30 | 1.70 | 2.00 | 2.30 | 2.70 |
| 16 A + B | 4.72 | 5.02 | 5.42 | 5.72 | 6.02 | 6.42 | 6.72 | 4.78 | 5.08 | 5.38 | 5.78 | 6.08 | 6.38 | 6.78 |
| Ink Manufacturability | ○ | ○ | ○ | ○ | ○ | ○ | ○ | ○ | ○ | ○ | ○ | ○ | ○ | ○ |
| Permeability | x | ○ | ○ | ○ | ○ | ○ | ○ | x | ○ | ○ | ○ | ○ | ○ | ○ |
| Print Quality | x | ○ | ○ | ○ | ○ | ○ | x | x | ○ | ○ | ○ | ○ | ○ | x |
| Fluorescence Intensity | — | ○ | ○ | ○ | ○ | ○ | — | — | ○ | ○ | ○ | ○ | ○ | — |

As is clear from this Table, where "16A+B" is 5.0 or more, but 6.5 or less, the ink which can satisfy all points of the quick-drying property (permeability), print quality, and adequately significant change in the hue, lightness, and saturation of the print part is produced. Where "16A+B" is less than 5.0, the quick-drying property and print quality become inferior. Where "16A+B" exceeds 6.5, the quick-drying property is superior, but the print quality becomes inferior. Regarding Nos. 2-1, 2-7, 2-8, or 2-14, since the print quality was inferior, evaluation of the fluorescence-emitting condition of the print part was not performed. Regarding all samples, generation of bubbles, etc., did not occur during manufacture of the ink and, therefore, the ink manufacturability was excellent.

Third Embodiment

As the fluorescent compound constituting the second ink of the present invention, "LUMIKOL NKW-3005" manufactured by Nippon Keiko Kagaku K.K., was prepared. This is a dispersion liquid in which yellow fine particle fluorescent pigments are dispersed in water, and a solids concentration is 42% by weight.

As the first compound of the surfactant constituting the second ink of the present invention, "Surfynol 104H (manufactured by Air Products and Chemicals. Inc.)", which was an aqueous solution containing 37.5% by weight of the first compound, was prepared. As the second compound of the surfactant constituting the ink of the present invention, "Surfynol 82 (manufactured by Air Products and Chemicals. Inc.)" made of the powder of the second compound was prepared. Furthermore, glycerin and n-methyl-2-pyrrolidone were prepared as other additives.

Each of these components and ultrapure water were mixed in order that the content of the components, dispersion of fluorescent compound, n-methyl-2-pyrrolidone, and glycerin, might become 6.0% by weight, 8.0% by weight, and 20% by weight, respectively, and, therefore, many sorts of ink were manufactured, in which the content A (% by weight) of the first compound and the content B (% by weight) of the second compound were changed.

The contents A and B of the first compound and the second compound were changed as shown in the following Table 3. The weight of the effect of enhancing ink permeability of the first compound was assumed to be 16 times larger than that of the second compound, and a permeability evaluation value (16A+B) of the surfactant formed of a mixture of both compounds was determined by calculation.

Printing tests were performed using the many sorts of ink manufactured, and the permeability of the ink after printing (quick-drying property), print quality, and fluorescence-emitting condition of the print part were examined in the same manner as that in the First embodiment. These results are collectively shown in the following Table 3 as well.

print quality was inferior, evaluation of the fluorescence-emitting condition of the print part was not performed. Regarding all samples, generation of bubbles, etc., did not occur during manufacture of the ink and, therefore, the ink manufacturability was excellent.

The aforementioned each component was used in order that n-methyl-2-pyrrolidone might become 8.0% by weight, glycerin might become 20% by weight, the content A of the first compound might become 0.5% by weight, and the content B of the second compound might be 2.5% by weight while the content of the dispersion liquid of fluorescent compound was changed as shown in the following Table 2 and, therefore, many sorts of ink were manufactured. Printing tests were performed using the many sorts of ink manufactured, and the permeability of the ink after printing (quick-drying property), print quality, and fluorescence-emitting condition of the print part were examined in the same manner as that in the First embodiment.

These results are shown in the following Table 4.

TABLE 3

| | No. 3- | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 104H Addition Amount (wt %) | | | 0.50 | | | | | | 0.60 | | | | | 0.70 | | |
| Content A of the First Compound (wt %) | | | 0.188 | | | | | | 0.225 | | | | | 0.263 | | |
| Content B of the Second Compound (wt %) | 1.50 | 2.00 | 2.50 | 3.00 | 3.50 | 4.00 | 1.00 | 1.50 | 2.00 | 2.50 | 3.00 | 0.50 | 1.00 | 1.50 | 2.00 | 2.50 |
| 16 A + B | 4.5 | 5.0 | 5.5 | 6.0 | 6.5 | 7.0 | 4.6 | 5.1 | 5.6 | 6.1 | 6.6 | 4.7 | 5.2 | 5.7 | 6.2 | 6.7 |
| Ink Manufacturability | ○ | ○ | ○ | ○ | ○ | ○ | ○ | ○ | ○ | ○ | ○ | ○ | ○ | ○ | ○ | ○ |
| Permeability | x | ○ | ○ | ○ | ○ | ○ | x | ○ | ○ | ○ | ○ | x | ○ | ○ | ○ | ○ |
| Print Quality | x | ○ | ○ | ○ | ○ | x | x | ○ | ○ | ○ | x | x | ○ | ○ | ○ | x |
| Fluorescence Intensity | — | ○ | ○ | ○ | ○ | — | — | ○ | ○ | ○ | — | — | ○ | ○ | ○ | — |

TABLE 4

| | No. 4- | | | | | | | | | |
|---|---|---|---|---|---|---|---|---|---|---|
| | 1 | 2 | 3 | 4 | 5 | 6 | 7 | 8 | 9 | 10 |
| Content of dispersion liquid of Fluorescent Compound (wt %) | 0.42 | 0.84 | 1.26 | 1.68 | 2.1 | 2.52 | 2.94 | 3.36 | 3.78 | 4.2 |
| Print Quality | ○ | ○ | ○ | ○ | ○ | ○ | ○ | ○ | ○ | ○ |
| Fluorescence Intensity | x | x | x | ○ | ○ | ○ | ○ | ○ | ○ | Q |

As is clear from this Table, where "16A+B" is 5.0 or more, but 6.5 or less, the ink which can satisfy all points of the quick-drying property (permeability), print quality, and adequately significant change in the hue, lightness, and chroma of the print part is produced. Where "16A+B" is less than 5.0, the quick-drying property and print quality become inferior. Where "16A+B" exceeds 6.5, the quick-drying property is superior, but the print quality becomes inferior. Regarding Nos. 3-1, 3-6, 3-7, 3-11, 3-12, or 3-16, since the As the fluorescent compound, "Kayarus Light Yellow F8G" manufactured by NIPPON KAYAKU COLORS CO., was prepared. Except for that, the aforementioned each component was used in order that n-methyl-2-pyrrolidone might become 8.0% by weight, glycerin might become 20% by weight, the content A of the first compound might become 0.5% by weight, and the content B of the second compound might be 2.5% by weight while the content of the fluorescent compound was changed as shown in the following Table 5 and, therefore, many sorts of ink were manufactured. Printing tests were performed using the many sorts of ink manufactured, and the permeability of the ink after printing (quick-drying property), print quality, and fluorescence-emitting condition of the print part were examined in the same manner as that in the First embodiment.

These results are shown in the following Table 5.

TABLE 5

| | No. 5- | | | | | | | |
|---|---|---|---|---|---|---|---|---|
| | 1 | 2 | 3 | 4 | 5 | 6 | 7 | 8 |
| Content of Fluorescent Compound (wt %) | 0.1 | 0.2 | 0.3 | 0.5 | 0.7 | 1 | 2 | 4 |
| Print Quality | ○ | ○ | ○ | ○ | ○ | ○ | ○ | ○ |
| Fluorescence Intensity | x | ○ | ○ | ○ | ○ | ○ | ○ | ○ |

As the fluorescent compound, "Kayaset Flavine F2G" manufactured by NIPPON KAYAKU COLORS CO., was prepared. Except for that, the aforementioned each component was used in order that n-methyl-2-pyrrolidone might become 8.0% by weight, glycerin might become 20% by weight, the content A of the first compound might become 0.5% by weight, and the content B of the second compound might be 2.5% by weight while the content of the fluorescent compound was changed as shown in the following Table 6 and, therefore, many sorts of ink were manufactured. Printing tests were performed using the many sorts of ink manufactured, and the permeability of the ink after printing (quick-drying property), print quality, and fluorescence-emitting condition of the print part were examined in the same manner as that in the First embodiment.

These results are shown in the following Table 6.

TABLE 6

| | No. 6- | | | | | | |
|---|---|---|---|---|---|---|---|
| | 1 | 2 | 3 | 4 | 5 | 6 | 7 |
| Content of Fluorescent Compound (wt %) | 0.1 | 0.2 | 0.4 | 0.7 | 1 | 1.5 | 2 |
| Print Quality | ○ | ○ | ○ | ○ | ○ | ○ | ○ |
| Fluorescence Intensity | ○ | ○ | ○ | ○ | ○ | ○ | Q |

In the first ink and the second ink of the present invention, regarding the surfactant, preferably, not only the relationship between the first compound and the second compound satisfy "$5.0 \leq 16A+B \leq 6.5$", "$A>0$", and "$B>0$", but also the concentration of each of the first and second compounds alone in the ink becomes "$0.1 \leq A \leq 0.4$" and "$1.0 \leq B \leq 4.0$". Where the content of the first compound is excessively high, since the solubility in water is reduced, homogeneity of the ink is degraded even if a large amount of organic solvent is added. Where the content of the second compound is excessively high, since the ink becomes likely to move along fibers of the paper and to get into gaps between the fibers, the print quality is degraded.

Fourth Embodiment

As the liquid of fluorescent compound constituting the third ink of the present invention, "Kayaphor S Liquid" manufactured by NIPPON KAYAKU COLORS CO., LTD., and "SF-5017" manufactured by SINLOIHI CO., LTD., were prepared. Furthermore, n-methyl-2-pyrrolidone and glycerin were prepared as other additives, and "Surfynol 104H" was prepared as the surfactant.

Each of these components and ultrapure water were mixed in order that the content of the components, "Kayaphor S Liquid", "SF-5017", n-methyl-2-pyrrolidone, glycerin and "Surfynol 104H" might become 3.0% by weight, 5.0% by weight, 8.0% by weight, 20% by weight, and 0.8% by weight, respectively, and ink was thus manufactured.

Printing tests were performed using the ink manufactured, and the permeability of the ink after printing (quick-drying property), print quality, and fluorescence-emitting condition of the print part were examined in the same manner as that in the First embodiment. The permeability and print quality of the print produced were excellent, the color of the print part was pink under visible light, although it showed very bright purple under ultraviolet irradiation.

As the fluorescent compound, 12% by weight of "NKW-3005" manufactured by Nippon Keiko Kagaku K.K., was prepared instead of "SF-5017". Except for that, the aforementioned each component was used in order that "Kayaphor S Liquid", n-methyl-2-pyrrolidone, and glycerin might become 3.0% by weight, 8.0% by weight, and 20% by weight, respectively, and each of these components and ultrapure water were mixed so as to manufacture ink.

Printing tests were performed using the ink manufactured, and the permeability of the ink after printing (quick-drying property), print quality, and fluorescence-emitting condition of the print part were examined in the same manner as that in the First embodiment. The permeability and print quality of the print produced were excellent, and the color of the print part was yellow under visible light, although it showed very bright bluish white under ultraviolet irradiation.

As the fluorescent compound, 0.5% by weight of "Kayarus Light Yellow F8G" manufactured by NIPPON KAYAKU COLORS CO., Ltd., was prepared instead of "NKW-3005". Except for that, the aforementioned each component was used in order that "Kayaphor S Liquid", n-methyl-2-pyrrolidone, and glycerin might become 3.0% by weight, 8.0% by weight, and 20% by weight, respectively, and each of these components and ultrapure water were mixed so as to manufacture ink.

Printing tests were performed using the ink manufactured, and the permeability of the ink after printing (quick-drying property), print quality, and fluorescence-emitting condition of the print part were examined in the same manner as that in the First embodiment. The permeability and print quality of the print produced were excellent, and the color of the print part was yellow under visible light, although it showed very bright bluish white under ultraviolet irradiation.

As the liquid of fluorescent compound, 12% by weight of "NKW-3002" manufactured by Nippon Keiko Kagaku K.K., was prepared instead of "Kayarus Light Yellow F8G". Except for that, the aforementioned each component was used in order that "Kayaphor S Liquid", n-methyl-2-pyrrolidone, and glycerin might become 3.0% by weight, 8.0% by weight, and 20% by weight, respectively, and each of these components and ultrapure water were mixed so as to manufacture ink.

Printing tests were performed using the ink manufactured, and the permeability of the ink after printing (quick-drying property), print quality, and fluorescence-emitting condition of the print part were examined in the same manner as that in the First embodiment. The permeability and print quality of the print produced were excellent, and the color of the print part was yellow-green under visible light, although it showed very bright blue under ultraviolet irradiation.

As the liquid of fluorescent compound, 12% by weight of "NKW-3004" manufactured by Nippon Keiko Kagaku K.K., was prepared instead of "NKW-3002". Except for that, the aforementioned each component was used in order that "Kayaphor S Liquid", n-methyl-2-pyrrolidone, and glycerin might become 3.0% by weight, 8.0% by weight, and 20% by weight, respectively, and each of these components and ultrapure water were mixed so as to manufacture ink.

Printing tests were performed using the ink manufactured, and the permeability of the ink after printing (quick-drying property), print quality, and fluorescence-emitting condition of the print part were examined in the same manner as that in the First embodiment. The permeability and print quality of the print produced were excellent, and the color of the print part was orange under visible light, although it showed very bright purple under ultraviolet irradiation.

As the liquid of fluorescent compound, "Kayaphor S Liquid" manufactured by NIPPON KAYAKU COLORS CO., LTD., and "Kayarus Light Yellow F8G" manufactured by NIPPON KAYAKU COLORS CO., Ltd., were prepared. "Surfynol 104H" was prepared as the first compound of the surfactant and "Surfynol 82" was prepared as the second compound of the surfactant. Furthermore, n-methyl-2-pyrrolidone and glycerin were prepared.

The content of the components, "Kayaphor S Liquid", "Kayarus Light Yellow F8G", n-methyl-2-pyrrolidone, and glycerin, were made to become 3.0% by weight, 0.5% by weight, 8.0% by weight, and 20% by weight, respectively, and, therefore, many sorts of ink were manufactured, in which the content A (% by weight) of the first compound and the content B (% by weight) of the second compound were changed.

The contents A and B of the first compound and the second compound were changed as shown in the following Table 7. The weight of the effect of enhancing ink permeability of the first compound was assumed to be 16 times larger than that of the second compound, and a permeability evaluation value (16A+B) of the surfactant formed of a mixture of both compounds was determined by calculation.

Printing tests were performed using the inks manufactured, and the permeability of the ink after printing (quick-drying property), print quality, and fluorescence-emitting condition of the print part were examined in the same manner as that in the First embodiment. The permeability and print quality of the print produced were excellent, and the color of the print part was yellow under visible light, although it showed very bright bluish white under ultraviolet irradiation.

These results are collectively shown in the following Table 7 as well.

TABLE 7

|  | No. 7- | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| 104H Addition Amount (wt %) |  |  | 0.50 |  |  |  | 0.60 |  |  | 0.70 |
| Content A of the First Compound (wt %) |  |  | 0.188 |  |  |  | 0.225 |  |  | 0.263 |
| Content B of the Second Compound (wt %) | 2.00 | 2.50 | 3.00 | 3.50 | 1.50 | 2.00 | 2.50 | 1.00 | 1.50 | 2.00 |
| 16 A + B | 5.0 | 5.5 | 6.0 | 6.5 | 5.1 | 5.6 | 6.1 | 5.2 | 5.7 | 6.2 |
| Ink Manufacturability | ○ | ○ | ○ | ○ | ○ | ○ | ○ | ○ | ○ | ○ |
| Permeability | ○ | ○ | ○ | ○ | ○ | ○ | ○ | ○ | ○ | ○ |
| Print Quality | ○ | ○ | ○ | ○ | ○ | ○ | ○ | ○ | ○ | ○ |
| Fluorescence Intensity | ○ | ○ | ○ | ○ | ○ | ○ | ○ | ○ | ○ | Q |

As is clear from this Table, when "16A+B" is 5.0 or more, but 6.5 or less, the ink which can satisfy all points of the quick-drying property (permeability), print quality, and adequately significant change in the hue, lightness, and saturation of the print part is produced.

What is claimed is:

1. An ink for an ink-jet printer, comprising:
a first fluorescent compound which has absorption in the visible light range and which emits fluorescence by ultraviolet irradiation; and
a second fluorescent compound which has no absorption in the visible light range and which emits fluorescence, by ultraviolet irradiation, with a hue different from that of the fluorescence emitted from the first fluorescent compound under visible light.

2. An ink for an ink-jet printer, comprising:
a fluorescent compound which has no absorption in the visible light range and which emits fluorescence by ultraviolet irradiation;
a surfactant; and
water;
the surfactant being an acetylenediol-based surfactant represented by Chemical formula (1),

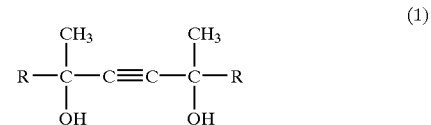

and including a mixture of a first compound and a second compound where R is an isobutyl group (—CH$_2$CH (CH$_3$)CH$_3$) and where R is an ethyl group (—CH$_2$CH$_3$), respectively, and where the content of the first compound in the ink is indicated by A (% by weight) and the content of the second compound is indicated by B (% by weight), A and B being more than "0", and the relationship between A and B satisfying the formula 5.0≦16A+B≦6.5.

3. An ink for an ink-jet printer, comprising:
a first fluorescent compound which has absorption in the visible light range and which emits fluorescence by ultraviolet irradiation;
a second fluorescent compound which has no absorption in the visible light range and which emits fluorescence by ultraviolet irradiation;
a surfactant; and
water;
the surfactant being an acetylenediol-based surfactant represented by Chemical formula (1),

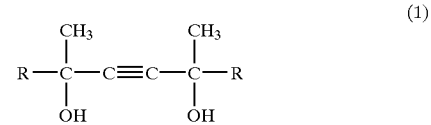

and including a mixture of a first compound and a second compound where R is an isobutyl group (—CH$_2$CH ($CH_3$)$CH_3$) and where R is an ethyl group (—$CH_2CH_3$), respectively, and where the content of the first compound in the ink is indicated by A (% by weight) and the content of the second compound is indicated by B (% by weight), A and B being more than "0", and the relationship between A and B satisfying the formula $5.0 \leq 16A+B \leq 6.5$.

4. An ink for an ink-jet printer, comprising:

a first fluorescent compound which has absorption in the visible light range and which emits fluorescence by ultraviolet irradiation;

a second fluorescent compound which has no absorption in the visible light range and which emits fluorescence, by ultraviolet irradiation, with a hue different from that of the fluorescence emitted from the first fluorescent compound under visible light; and a surfactant, the surfactant being an acetylenediol-based surfactant represented by Chemical formula (1),

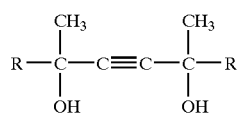
(1)

and including a mixture of a first compound and a second compound where R is an isobutyl group (—$CH_2CH$($CH_3$)$CH_3$) and where R is an ethyl group (—$CH_2CH_3$), respectively, and where the content of the first compound in the ink is indicated by A (% by weight) and the content of the second compound is indicated by B (% by weight), A and B being more than "0", and the relationship between A and B satisfying the formula $5.0 \leq 16A+B \leq 6.5$.

5. The ink for an ink-jet printer according to claim 4, an average particle diameter of the dispersing element being 500 nm or less.

6. The ink for an ink-jet printer according to claim 4, the second fluorescent compound which has no absorption in the visible light range and which emits fluorescence, by ultraviolet irradiation, with a hue different from that of the fluorescence emitted from the first fluorescent compound under visible light being a fluorescent whitener.

7. The ink for an ink-jet printer according to claim 5, the second fluorescent compound which has no absorption in the visible light range and which emits fluorescence, by ultraviolet irradiation, with a hue different from that of the fluorescence emitted from the first fluorescent compound under visible light being a fluorescent whitener.

* * * * *